United States Patent

Rothe

[19]

[11] Patent Number: 6,035,654
[45] Date of Patent: Mar. 14, 2000

[54] AIR-CONDITIONING ELEMENT AND METHOD FOR ITS MANUFACTURE

[75] Inventor: Frank Rothe, Neuburg, Germany

[73] Assignee: VAW Metawell GmbH metal sandwich technology, Neuburg/Donau, Germany

[21] Appl. No.: 09/111,156

[22] Filed: Jul. 7, 1998

[30] Foreign Application Priority Data

Jul. 7, 1997 [DE] Germany .................... 297 11 839

[51] Int. Cl.⁷ .................. F25D 23/12; F24H 9/06; F24D 19/02
[52] U.S. Cl. .................. 62/259.1; 165/53; 165/57
[58] Field of Search .................. 62/259.1; 165/49, 165/50, 53, 54, 55, 56, 57; 52/220.1, 220.2, 220.4, 220.8

[56] References Cited

U.S. PATENT DOCUMENTS

| | | | |
|---|---|---|---|
| 272,653 | 2/1883 | Cogswell | 62/259.1 |
| 2,641,449 | 6/1953 | Antony | 165/49 |
| 2,988,980 | 6/1961 | Tschudin . | |
| 3,283,693 | 11/1966 | Howell | 454/186 |
| 3,693,705 | 9/1972 | Stotz | 165/53 |
| 4,168,740 | 9/1979 | Cairenius | 165/49 |
| 4,856,238 | 8/1989 | Kesting | 454/186 |

FOREIGN PATENT DOCUMENTS

| | | |
|---|---|---|
| 933 410 | 9/1955 | Germany . |
| 39 32 972 A1 | 4/1991 | Germany . |
| 94 01 705 U1 | 4/1994 | Germany . |
| 296 00 420 U1 | 5/1996 | Germany . |
| 7879 | 6/1999 | Japan . |
| 777 265 | 6/1957 | United Kingdom . |

*Primary Examiner*—William Doerrler
*Attorney, Agent, or Firm*—Darby & Darby

[57] ABSTRACT

An air-conditioning element includes ducts, through which gaseous or liquid media are passed for cooling or heating. The air-conditioning element is constructed as a solid metal sandwich with a light core of corrugated aluminum and covering layers of smooth aluminum strip. The media guides are formed between the corrugated aluminum and the covering layers, and the media guides are connected with one another by way of the ducts. A method for the production of the air-conditioning element includes the steps of joining together at a joint a stack of two covering layers and a core of corrugated aluminum, which is disposed between the covering layers, by hot rolling, adhesives, lacquers or other adhesion promoters that have been previously brought into the regions of the joint; and after the stack has cooled, milling a duct in a perpendicular direction to the course of the corrugations, and then closing off the open sections of the duct by a metal strip.

10 Claims, 1 Drawing Sheet

AIR-CONDITIONING ELEMENT AND METHOD FOR ITS MANUFACTURE

FIELD OF THE INVENTION

The invention relates to an air-conditioning element with ducts, through which gaseous or liquid media are passed for heating or cooling.

BACKGROUND

In the prior art, air-conditioning elements consisted of at least two individual components, namely, a support plate, such as a sandwich material, and solid sheet metal or plaster board. At least one additional element, such as pipe coils, beaded sheet metal, or the like, was provided for the passage of heat-transferring media.

Such air-conditioning elements in the prior art have the disadvantage that their heat dissipation is not uniform, since heat must first be transferred from the media-carrying ducts or pipes into the individual heat-exchanger plates.

Moreover, the air-conditioning elements in the prior art have a relatively large structural height, since the media-carrying ducts and heat-exchanger elements are disposed separately from one another as structural components. As a result, there are also heat losses in insulation, since an air gap or insulating materials is frequently disposed between the heat-transferring media and the heat-emitting construction element.

SUMMARY OF THE INVENTION

It is an object of the present invention to provide an improved air-conditioning element in which the heat dissipation is increased in relation to the available total area, the insulation losses are decreased, and wherein the structural height can be decreased to a minimum dimension required for improved static strength and improved energy efficiency for low flow temperatures.

Pursuant to the invention, this objective is accomplished by a fully integrated air-conditioning element having inlet and outlet ducts, through which gaseous or liquid media are passed as heat-transferring media for cooling or heating, and a metal sandwich including a light core of corrugated aluminum and a pair of covering layers of smooth aluminum strip. A plurality of media guides are formed between the corrugated aluminum and the covering layers, with the media guides being connected with one another by way of the inlet and outlet ducts.

With this invention, insulation losses can be reduced to a minimum by using a thin metal cover plate between the heat-transferring media and the surroundings which are to be cooled or heated. This leads to low flow temperatures, which differ only slightly from the nominal temperatures, and which are to be set in the room that is to be air-conditioned.

In comparison to previously used two-component heat radiators or low-temperature radiators in the prior art, the fully integrated air-conditioning element of the present invention has a comparatively low structural height. Apart from a relatively narrow edge region, the total area can be used for the air-conditioning. The economic benefit is therefore optimum in relation to the material used.

DETAILED DESCRIPTION OF THE PREFERRED EMBODIMENTS

Figure 1:
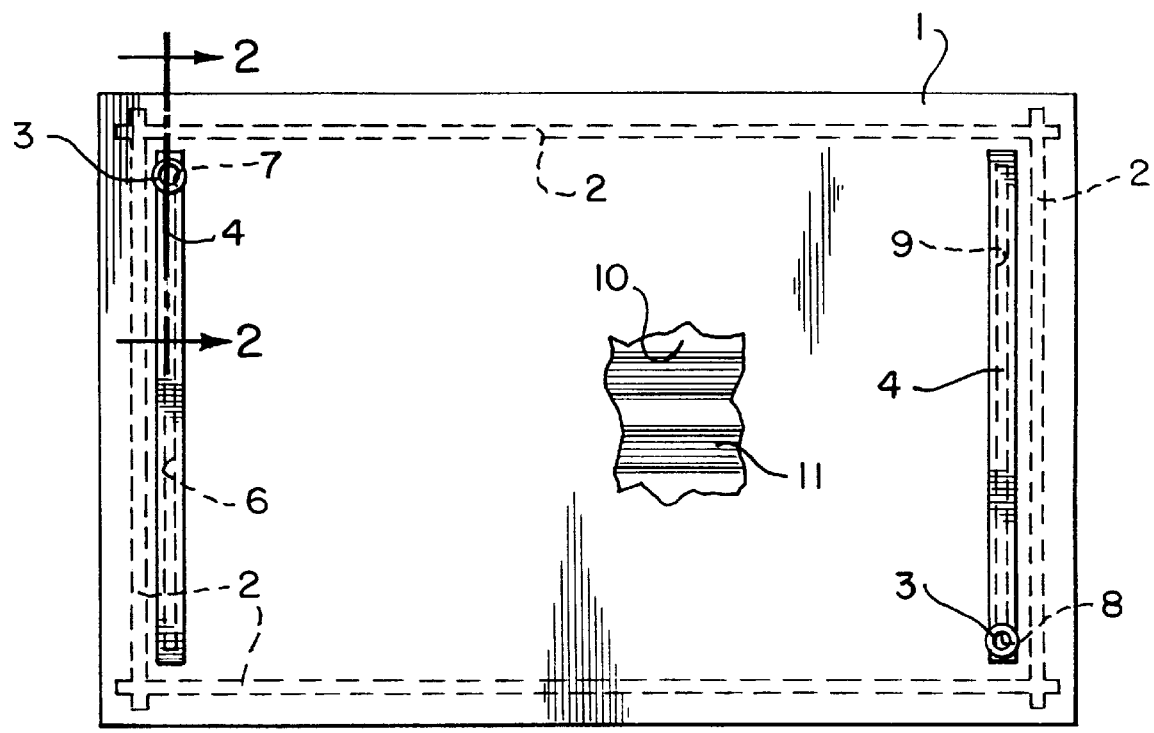
FIG. 1 shows an overall plan view of the inventive air-conditioning element.
Figure 2:
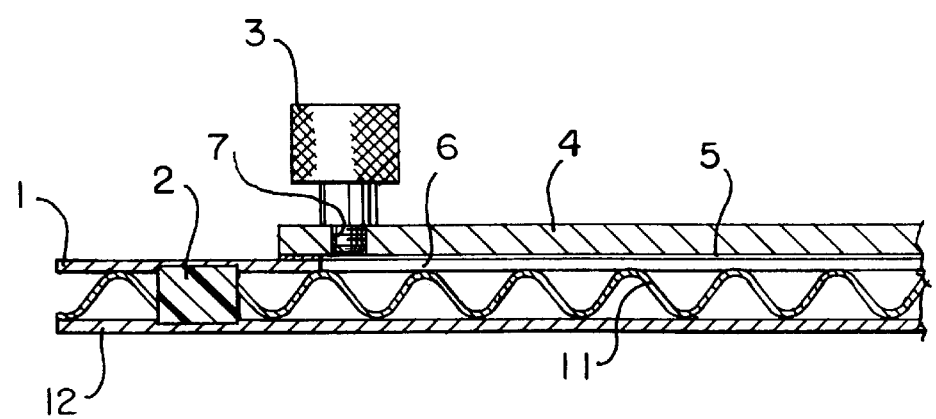
FIG. 2 shows a partial cross-sectional view of the inventive air-conditioning element along the line 2—2 of FIG. 1.

In FIGS. 1–2 the inventive air-conditioning element is shown having a top cover plate 1 above a bottom cover plate 12, with a peripheral seal 2 between the cover plates 1 and 12. Distribution ducts 6 and 9 are provided through the cover plates 1 and 12 through which gaseous or liquid media are passed for cooling or heating. The ducts 6 and 9 are milled as slots extending through the cover plate 1. Profile covers 4 are then positioned over the slots to close the ducts 6 and 9. The covers may be held in place by an adhesive 5. The device is constructed as a solid metal sandwich formed by a light core of corrugated aluminum 11 and by the cover plates 1 and 12 which may comprise smooth aluminum strips. The spaces formed by the crests and valleys of the corrugated aluminum 11 between the covering layers 1 and 12 form media guides, with the media guides being connected with one another by way of the ducts 6 and 9.

The wave orientation of the ribs of the corrugated aluminum 11 is shown through a cut-out section 10 in the center of the cover plate 1 (FIG. 1). In the example shown, the wave orientation extends in a horizontal direction from the left to the right of the air-conditioning element shown in FIG. 1.

An inlet 7 and an outlet 8 allow passage of the heat-transferring media, as shown in FIG. 1. Each of the inlet and outlet includes a connecting piece 3, which directs the cooling/heating media through a profile cover 4, as shown in FIG. 2.

Turbulent flows are more favorable than laminar flows in thermodynamic applications because a turbulent flow insures a better heat exchange between the media and the aluminum. Turbulent flows are accomplished by changes of the cross section and changes of the flow direction. Changes of the cross section are accomplished by irregular layers of glue on the inside faces of the cover layers 1 and 12. Changes of the flow direction are achieved by the ducts extending at right angles to the media guides. As a result, the media flows vertically through the ducts and horizontally through the media guides. Specifically, the heat-transferring media enters the inlet 7 in the upper left corner of the air-conditioning element in FIG. 1. The media then flows through the duct 6 and through the media guides between the waves of the corrugated aluminum 11 to the outlet 8.

Preferably, the distributing ducts 6 and 9 are milled into the sandwich plate. Apart from a relatively narrow edge region where the seals 2 are disposed, the total area of the air-conditioning element shown in FIG. 1 acts as an air-conditioned zone which can be used for the air-conditioning. For example, of the total area shown in FIG. 1, about 90% to 95% of the air-conditioning element functions as the air-conditioned zone. Using the present invention, the relative size of the zone may vary with different dimensions of the air-conditioning element.

The air-conditioning element, integrated pursuant to the present invention, can be used as a radiant ceiling, such as a cooling ceiling; as a radiant floor, for example, in the form of a floor heater; or as a radiant wall, for example, in a combined construction for heating and cooling. Typical areas of application are air-conditioned buildings, air containers, or vehicles of all types.

A method for the production of the air-conditioning element includes the steps of rolling three layers of sheet metal, such as aluminum, from three coils which are parallel to a common axis. The middle layer is corrugated to form the corrugations 11 and disposed between the other layers which form the cover layers 1 and 12. The layers are then positioned together with the corrugated layer 11 joined to the cover layers 1 and 12 at a joint and sealed together by gluing under pressure and high temperature. Alternatively, the joining may be achieved by hot rolling, adhesives, lacquers or other adhesion promoters that have been previously brought into the regions of the joint.

After the joined layers have cooled, milling of the ducts 6 and 9 and grooves for the seals 2 is performed in a perpendicular direction to the course of the corrugations. The grooves are filled with a sealant such as PUR to form the seals 2. Then the ducts 6 and 9 are closed by the profile covers 4. The profile covers 4 may be cut from metal strips with substantially the same length as the ducts 6 and 9, and provided with bores for the inlet and outlet. The covers are attached to the cover plate 1 by the adhesive joint 5.

Preferably, the region of the element bounded by the peripheral seal 2 (the air-conditioning zone) is 90% to 95% of the total area of the air-conditioning element.

An air-conditioning element construed in accordance with the invention may be incorporated into load-bearing walls. It may also be incorporated into a vehicle panel or a container for temperature sensitive goods in storage, for use as an air-conditioning element.

What is claimed is:

1. An air-conditioning element comprising:
   a core of corrugated aluminum;
   a pair of covering layers of smooth aluminum strip attached to said core to form a plurality of media guides between the corrugated aluminum and the covering layers;
   at least two elongated ducts defined substantially planar through one of said covering layers and the core, whereby a heat transferring fluid can be passed between said ducts through said media guides, each duct extends transversely to the ribs of the corrugated aluminum; and
   connecting pieces for connecting the media guides to a heating or cooling unit, said connecting pieces being attached to respective covers sealing said ducts, and the media guides being connected to said connecting piece in the region of said ducts.

2. The air-conditioning element of claim 1, wherein edge regions of the air-conditioning element are shielded by a seal from the gaseous or liquid media.

3. The air-conditioning element of claim 2, wherein the seal is disposed between the cover layers.

4. The air-conditioning element of claim 3, wherein the seal extends the entire distance between the cover layers.

5. An air-conditioning element comprising:
   a core of corrugated aluminum;
   a pair of covering layers of smooth aluminum strip attached to said core to form a plurality of media guides between the corrugated aluminum and the covering layers;
   at least two elongated ducts extending through one of said cover plates and the core, whereby a heat transferring fluid can be passed between said ducts through said media guides; each duct extends transversely to the ribs of the corrugated aluminum.

6. The air-conditioning element of claim 1, wherein the ducts are terminated by a peripheral seal in the air-conditioning element.

7. The air-conditioning element of claim 6, wherein the air-conditioned zone occupies 90% to 95% of the total area of the air-conditioning element.

8. The structural element of claim 1 incorporated into a load-bearing wall for use as an air-conditioning clement within the wall.

9. A method for producing an air-conditioning element comprising the steps of:
   joining together at a joint a stack of two covering layers and a core of corrugated aluminum, disposed between the covering layers, permitting the stack to cool;
   after the stack has cooled, milling a duct in a perpendicular direction to the course of the corrugations; and
   closing off the open sections of the duct by a cover.

10. The structural element of claim 1 incorporated into a load-bearing wall for use as an air-conditioning element within the wall.

* * * * *